US011160089B2

(12) United States Patent
Kwasnick et al.

(10) Patent No.: US 11,160,089 B2
(45) Date of Patent: *Oct. 26, 2021

(54) ASSESSMENT AND MITIGATION OF RADIO FREQUENCY INTERFERENCE OF NETWORKED DEVICES

(71) Applicant: Intel Corporation, Santa Clara, CA (US)

(72) Inventors: Robert F. Kwasnick, Palo Alto, CA (US); Clark VanDam, Hillsoboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/715,303

(22) Filed: Dec. 16, 2019

(65) Prior Publication Data

US 2020/0296730 A1 Sep. 17, 2020

Related U.S. Application Data

(63) Continuation of application No. 15/857,523, filed on Dec. 28, 2017, now Pat. No. 10,512,094.

(51) Int. Cl.
*H04W 72/08* (2009.01)
*H04W 12/12* (2021.01)
(Continued)

(52) U.S. Cl.
CPC ......... *H04W 72/082* (2013.01); *H04W 12/12* (2013.01); *H04L 67/12* (2013.01); *H04W 72/10* (2013.01)

(58) Field of Classification Search
CPC ... H04W 72/082; H04W 12/12; H04W 72/10; H04L 67/12
See application file for complete search history.

(56) References Cited

U.S. PATENT DOCUMENTS 5,594,943 A    1/1997  Balachandran
6,493,331 B1  12/2002  Walton et al.
(Continued)

OTHER PUBLICATIONS

"U.S. Appl. No. 15/857,523, Non Final Office Action dated Apr. 30, 2019", 8 pgs.
(Continued)

*Primary Examiner* — Brenda H Pham
(74) *Attorney, Agent, or Firm* — Schwegman Lundberg & Woessner, P.A,

(57) ABSTRACT

A system and method are provided for assessing and mitigating radio frequency interference (RFI) in a network comprising a plurality of wireless devices. During an RFI assessment phase the process includes receiving an attacker signal to operate as an attacker device and then responding to the attacker signal by transmitting a transmitted interference test packet (ITPkt) to one or more other wireless devices of the plurality of wireless devices. The transmitted ITPkt comprises ITPkt parameters includes a network identifier of the device, a transmission globally unique identifier, and a time of transmission for a transmitted interference test pattern (ITPat). The process additionally includes transmitting the transmitted ITPat at the time of transmission for the transmitted ITPat.

21 Claims, 6 Drawing Sheets

(51) Int. Cl.
 *H04L 29/08* (2006.01)
 *H04W 72/10* (2009.01)

(56) References Cited

U.S. PATENT DOCUMENTS

| | | |
|---|---|---|
| 10,512,094 B2 * | 12/2019 | Kwasnick .............. H04W 12/12 |
| 2008/0043686 A1 * | 2/2008 | Sperti ............... H04W 12/1201 |
| | | 370/338 |
| 2008/0216133 A1 | 9/2008 | Vergoossen |
| 2008/0250498 A1 * | 10/2008 | Butti ..................... H04W 12/12 |
| | | 726/23 |
| 2013/0336241 A1 | 12/2013 | Keon |
| 2014/0313979 A1 | 10/2014 | Himayat et al. |
| 2015/0365946 A1 | 12/2015 | Luong |
| 2016/0044685 A1 | 2/2016 | Nekovee |
| 2016/0088631 A1 | 3/2016 | Hedayat et al. |
| 2016/0127264 A1 | 5/2016 | Williamson et al. |
| 2016/0286432 A1 * | 9/2016 | Centonza ............ H04J 11/0056 |
| 2016/0302125 A1 | 10/2016 | Tejedor et al. |
| 2017/0142733 A1 | 5/2017 | Wang et al. |
| 2019/0045515 A1 | 2/2019 | Kwasnick et al. |

OTHER PUBLICATIONS

"U.S. Appl. No. 15/857,523, Response filed Jul. 18, 2019 to Non Final Office Action dated Apr. 30, 2019", 10 pgs.

"U.S. Appl. No. 15/857,523, Notice of Allowance dated Aug. 14, 2019", 7 pgs.

* cited by examiner

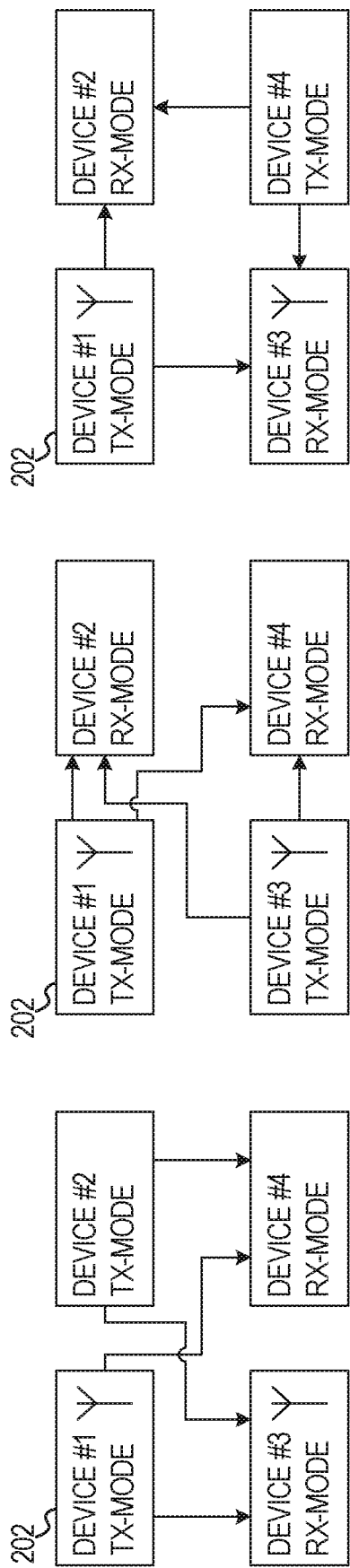
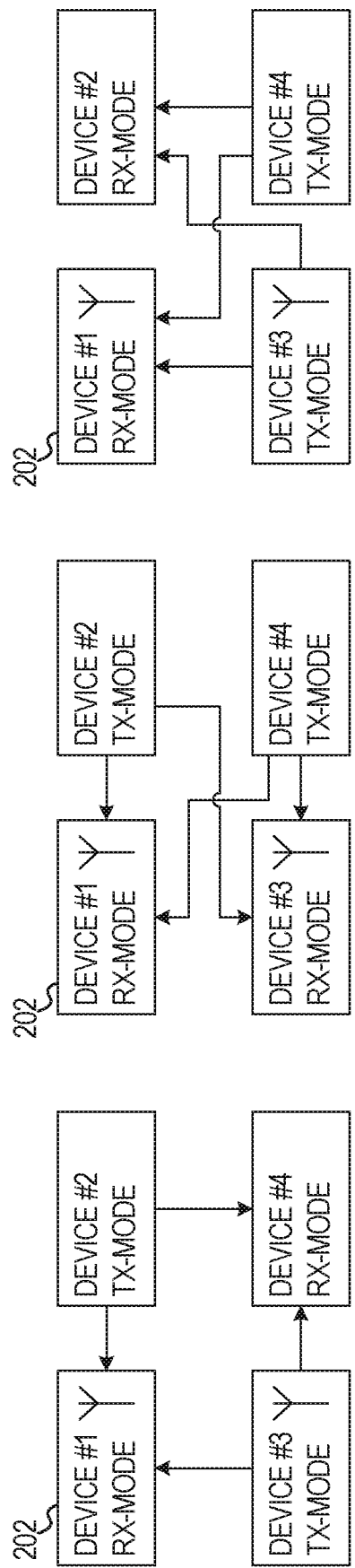
FIG. 5A  FIG. 5B  FIG. 5C  FIG. 5D  FIG. 5E  FIG. 5F

ASSESSMENT AND MITIGATION OF RADIO FREQUENCY INTERFERENCE OF NETWORKED DEVICES

PRIORITY APPLICATION

This application is a continuation of U.S. application Ser. No. 15/857,523, filed Dec. 28, 2017, which is incorporated herein by reference in its entirety.

TECHNICAL FIELD

Embodiments described herein generally relate to processing techniques used with data communications and interconnected device networks, and in particular, to techniques applied within internet of things (IoT) devices, communications devices, other radio frequency devices, and device networks.

BACKGROUND

IoT devices are physical objects that may communicate on a network, and may include sensors, actuators, and other input/output components, such as to collect data or perform actions from a real-world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

As IoT devices and IoT networks proliferate, dealing with the problem of radio-frequency interference (RFI) will become increasingly important. Design changes in chips to accommodate smaller designs may sometimes create unanticipated changes with respect to creating or receiving RFI.

Acronyms

The following acronyms may be used herein:

| | |
|---|---|
| 3GPP | Third Generation Partnership Project |
| 5G | Fifth Generation |
| AAA | authentication, authorization, and accounting |
| ADC | analog-to-digital |
| AI | artificial intelligence |
| AMD | Advanced Micro Devices |
| ARM | advanced RISC machines |
| ASIC | application specific integrated circuit |
| BATMAN | better approach to mobile ad-hoc networking |
| BLE | Bluetooth low-energy |
| CAN | Controller Area Network |
| CD-ROM | compact disc read-only memory |
| CoAP | Constrained Application Protocol |
| CPU | central processing unit |
| DDP | dual die package |
| DDR | double data rate (memory/standard) |
| DIMM | dual in-line memory module |
| DSP | digital signal processor |
| DVD-ROM | digital versatile disk-read-only memory |
| EDGE | Enhanced Data Rates for GSM Evolution |
| EISA | extended industry standard architecture |
| EEPROM | electrically erasable programmable read-only memory |
| EPROM | electrically programmable read-only memory |
| ETSI | European Telecommunications Standards Institute |
| FPGA | field-programmable gate array |
| GHz | gigahertz |
| GPRS | General Packet Radio Service |
| GPS | global positioning system |
| GSM | Global System for Mobile Communications |
| GUID | globally unique identifier |
| HDD | hard disk drive |
| HTTP | hyper-text transfer protocol |
| IEEE | Institute of Electrical and Electronics Engineers |
| IETF | Internet Engineering Task Force |
| IoT | Internet-of-things |
| ID | identifier |
| IO (I/O) | input-output |
| IP | Internet protocol |
| ISA | industry standard architecture |
| ITPat | interference test pattern |
| ITPkt | interference test packet |
| ITU | International Telecommunication Union |
| JEDEC | Joint Electron Devices Engineering Council |
| LAN | local area network |
| LCD | liquid crystal display |
| LED | light-emitting diode |
| LIN | Local Interconnect Network |
| LPDDR | low power double data rate (memory/standard) |
| LPWA | low-power wide area |
| LPWAN | Low Power Wide-Area Networks |
| LTE | Long-Term Evolution (standard) |
| LTE-A | Long-Term Evolution - Advanced (standard) |
| LWM2M | lightweight machine-to-machine |
| M2M | machine-to-machine |
| MAC | media access control |
| MCU | microcontroller unit |
| MUX | multiplexing |
| NIC | network interface controller |
| OCF | Open Connectivity Foundation |
| OLSR | optimized link state |
| OMA | Open Mobile Alliance |
| OMAP | Open Multimedia Applications Platform |
| PC | personal computer |
| PCI | peripheral component interconnect |
| PCIe | peripheral component interconnect express |
| PCIx | peripheral component interconnect extended |
| PDA | personal digital assistant |
| PROFIBUS | Process Field Bus |
| PROFINET | Process Field Net |
| RAM | random access memory |
| RF | radio frequency |
| RFI | radio frequency interference |
| RISC | reduced instruction set computer |
| RDT | Resource Director Technology (?) |
| QDP | quad die package |
| QoS | quality of service |
| SD | Secure Digital |
| SDP | single die package |
| SLA | service level agreement |
| SoC | system on a chip |
| SoCH | state of charge |
| SoF | state of function |
| SoH | state of health |
| SSDD | solid state disk drive |
| TCO | total cost of ownership |
| TOSSPAT | time-ordered-spectral-spatial-power allocation table |
| TV | television |
| UMTS | Universal Mobile Telecommunications System |
| USB | universal serial bus |
| VLSI | very-large-scale integration |
| VM | virtual machine |
| WAN | wide area network |
| xD | extreme digital |

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 5A-5F illustrate block diagrams of network communications among a number of IoT devices during the RFI assessment process, according to an example;

DETAILED DESCRIPTION

Figure 1:
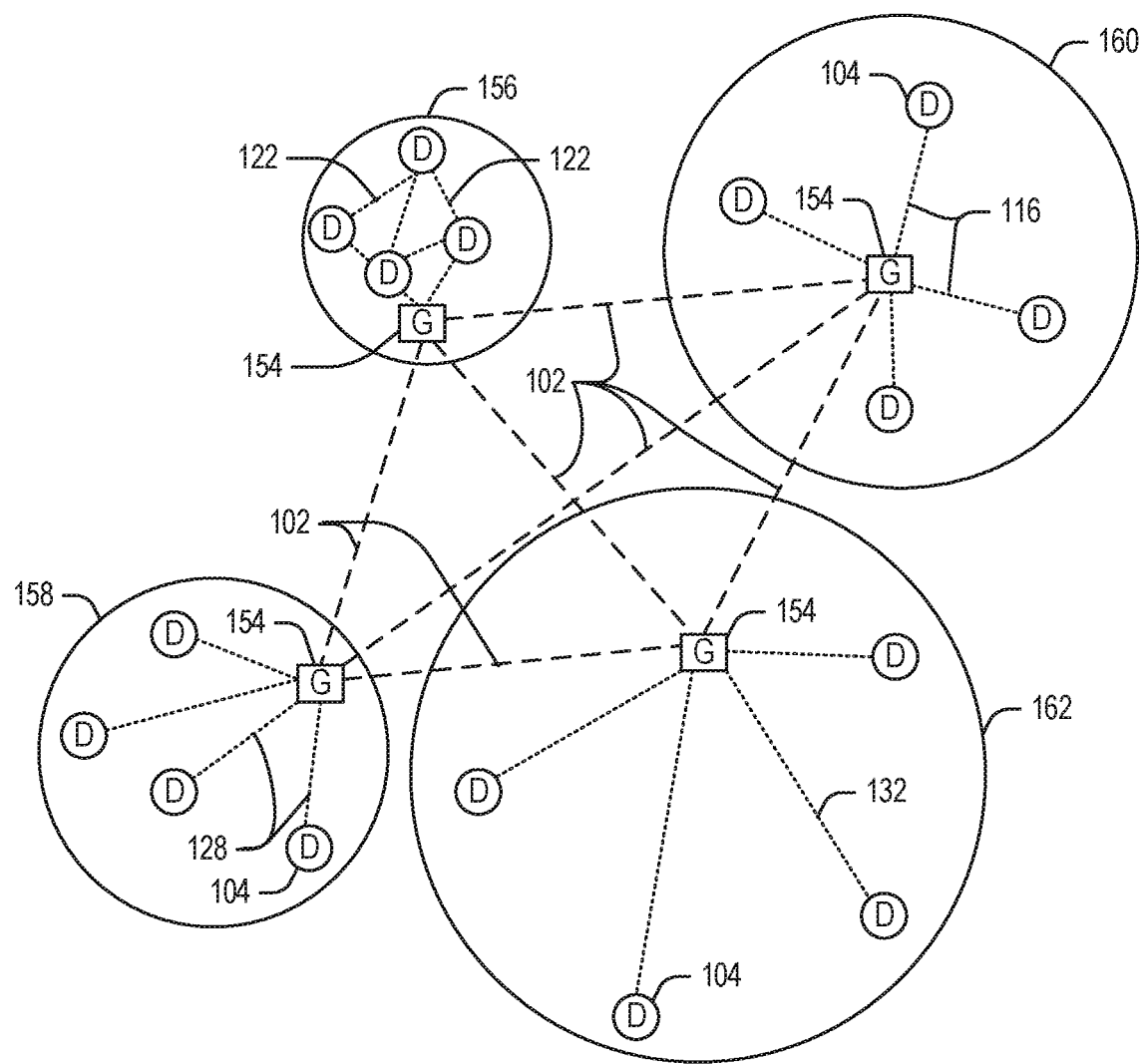
FIG. 1 illustrates a domain topology for respective internet-of-things (IoT) networks coupled through links to respective gateways, according to an example.

In the following description, methods, configurations, and related apparatuses are disclosed for operating with regard to safety and performance issues as well as security contexts in a device interconnection setting through the use of improved mitigation of harmful radio frequency/electromagnetic interference (hereafter, RFI) for networked wireless devices to benefit safety or performance. The network may include IoT devices, autonomous vehicles, or devices in a factory, home, or store, etc. The network may comprise devices which are either the same, or different, in form and function.

Previous solutions for dealing with RFI range from: a) a simplistic manual toggling of power to devices causing RFI (e.g., switching on and off various devices to determine a source of interference when operating a ham radio); to b) a more complex monitoring channel usage in a protocol such as Wi-Fi or other IEEE 802.11 protocol and selecting open channels rather than those in use to optimize signal strength. Cellular towers may include arrays that measure reception from transmit devices and choose the array antenna element with the strongest signal for that device to optimize signal strength. However, these systems do not necessarily account for safety as an interference metric, and they do not work well when networks comprise different types of network elements having different functions. Furthermore, they do not coordinate or prioritize spectral allocation for the network as a whole, but rather only for one pair of devices at a time. Finally, they do not predict and plan interference mitigation based on dynamic changes in signal strength and priority.

The techniques discussed herein include a system in which the RFI in a network of devices is collectively minimized by programming transmissions based on the function and importance of each device, guided by operator-established (or machine-learned) rules. The system performs an ongoing quantitative assessment of the collective interference between all devices. This assessment is used to define prioritized mitigation responses for each device based on a hierarchy of considerations based on each device's function, and therefore relative importance. Mitigations applied to an interfering device, in order of performance impact on the element being mitigated, include: shifting the frequency band (if there are multiple bands), delaying or reordering the transmissions (if there is a transmission queue among the devices), reducing power, and dropping packets (in a packet-based system). In this way, the system can address safety, reliability, and performance issues, given a cacophony of devices attempting to communicate at the same time without a realization of the relative importance of their transmissions.

Two brief examples illustrate safety aspects that may be addressed with an RFI assessment and mitigation system as described herein. In a first example, a future power plant may comprise an IoT network of communicating devices that range widely in criticality to plant function, safety, and cost. A water boiler that may have major safety consequences if it overheated has a higher priority in its network communications. In contrast, a building exit door may have relatively minimal safety consequences if it is ajar. In that situation, the communications of the water boiler take precedence over the communications of the exit door, and therefore, its transmissions are not restricted in a manner that might detrimentally affect its operation when the communications are interfering with each other.

In a second example, autonomous vehicle traffic in the future may comprise a network. An ambulance, police car, or other emergency vehicle on an active call has priority regarding movement (e.g., lane placement, traffic signals) and communications versus other vehicles on the road. Thus, other vehicles may be directed to reduce their transmissions temporarily (and reduce their speed, pull over to the side, or take other actions that give priority to the emergency vehicles for safety).

In more detail, the system may apply to a network comprising a plurality of devices, such as may be found in a home, factory, office, retail establishment, highway, etc., where different devices within the network may differ in form and function. Each device can both transmit (TX) and receive (RX), but not necessarily at the same time, frequency, signal strength or direction. Therefore, all devices on the network can be made aware of all other devices on the network through communication, and each device on the network has a unique identifier (otherwise the RFI contribution is attributed to temporal background).

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low signal and power levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smartphone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
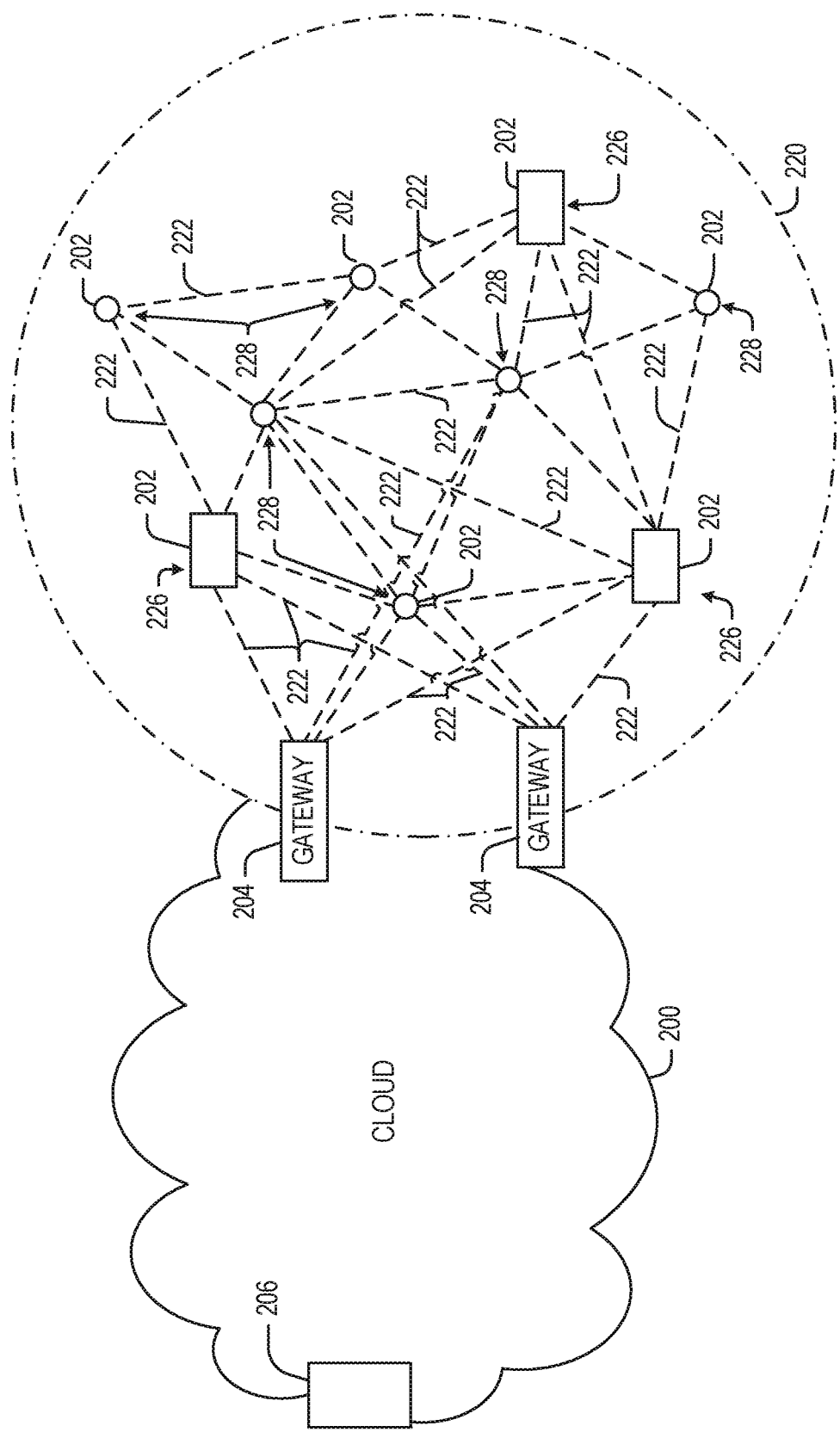
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks as fog devices (devices that process or act on data close to the source of the data) or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 6 and 7.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (BATMAN) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back-end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

In other examples, the operations and functionality described above with reference to FIGS. 3-5F may be embodied by a IoT device machine in the example form of an electronic processing system, within which a set or sequence of instructions may be executed to cause the electronic processing system to perform any one of the methodologies discussed herein, according to an example implementation. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

The edge clients send inference requests to the edge cloud through an AI training and inference switch and gateway. It allows each client to specify a Model ID and an optional requirement such as deadline, performance or cost. The gateway contains components that decide which inference model on which assets reachable from the gateway are to be used to satisfy each such request. In turn, each platform in the cloud is equipped with elements that provide necessary information to the gateway for it to make the best-informed decision.

Figure 3:
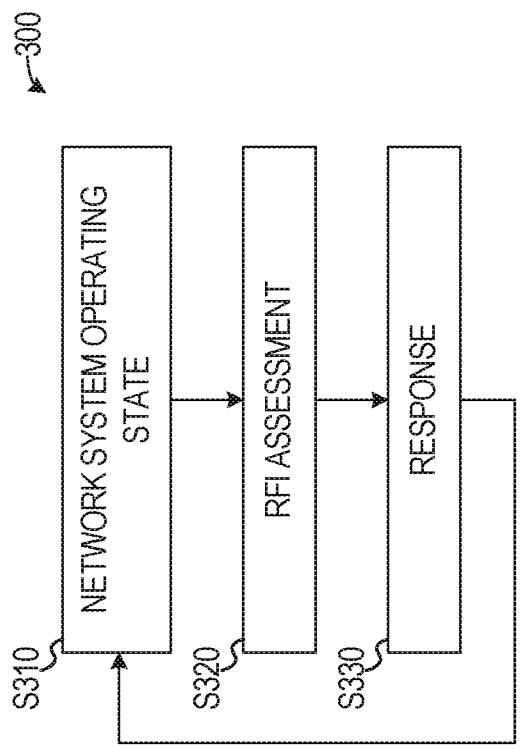
FIG. 3 illustrates an overall flowchart of an implementation of the RFI assessment and mitigation process, according to an example.

FIG. 3 illustrates a flow diagram that broadly illustrates the concepts described herein. Beginning from an operating state of the network system S310, the devices, such as IoT devices 202, periodically (based on a predefined period) or in response to a network disruption, in operation S320 (discussed in more detail below), initiate an RFI assessment to determine both qualitatively and quantitatively the relative contribution to overall RFI in received signals due to transmissions from all other devices 202. RFI that cannot be attributed to devices 202 within the IoT network are quantified as external (these are often transient in time and directional in nature) background RFI to the network.

Finally, in operation S330 (discussed in more detail below), a response is initiated to feedback and control the next state of the network system based on prioritization of function and importance of the device 202 which themselves may vary as a function of time. The response S330 may take advantage of well-known recursive state estimation techniques.

RFI Assessment (S320)

The RFI assessment S320 deals with the detection and quantification of RFI between networked devices 202, as well as transient background RFI external to the IoT system. At specified times, each device 202 on the network, behaving as an "RFI attacker" with a predefined communication protocol and test packets, transmits an "RFI test packet" to other devices 202 on the network in order to assess their sensitivity to RFI and hence vulnerability to being an "RFI victim". The RFI victim(s) devices 202 prepare to assess the RFI impact, including varying their state and operation during the RFI attack, as part of the RFI test. Subsequently, the RFI victim(s) share the results of the test, and upon completion of all devices being tested as both attacker and victim, if there is substantial RFI to one or more devices, a level of mitigation (as described herein) is applied to attackers, victims, or both, to reduce RFI.

In one implementation, each networked device 202—either directed autonomously or centrally directed—broadcasts an "interference test packet" (ITPkt) (while, if possible, varying signal directionality and strength) directing a single "attacker" device 202 on the network to prepare for an "interference test pattern" at a specified time, e.g., milliseconds in the future. The transmitting device's 202 test packet transmission may include one or more of the following: its network ID; the present time and the intended transmission time in the near future (to allow for time synchronization); TX power level, frequency bands, and other characteristics (e.g., radiation pattern and shape, GPS location, etc.); duration of the transmission; and a predetermined and universally-known-to-all-devices (via software) "interference test pattern" (ITPat) type that identifies an interference test pattern (of which many are possible, e.g., 0-1-0-1), followed by the "interference test pattern" itself (sent at the time indicated), and possibly a terminator indicating an end of the attacker transmission. An example test packet is as follows:

TABLE 1

Example Interference Test Packet Sent from an Attacker

Interference Test Packet Start Identifier;
Network ID (MAC address);
Unique TX GUID ID;
Message: TX1 says going to transmit in __ [ms] at __ Zulu time;
Power will be __ [mW];
Frequency band = __ to __ [GHz];
GPS (map) location;
Orientation of Antenna and Radiation Pattern Directionality;
Interference Test Pattern Type (e.g. 010101 . . . , 00000 . . . , 11111 . . . , random, etc.);
Terminator The receiving "victim" device 202 (or devices), upon receipt of the ITPkt: (1) prepares for the ITPat transmission by putting itself in a predetermined state, possibly comprising doing an internal computation with known data and instruction queue during the transmit signal and "RFI susceptibility" (e.g., low voltage power states may be more susceptible to interference than high voltage ones); (2) analyzes whether the pattern was correctly received with specific error details of the transmission and details such as signal strength; (3) analyzes whether its internal computation was performed correctly, and, if it failed, in what way; and then (4) transmit back a response packet containing the above information or data based on the above information into the original transmitting device or a centralized data aggregator.

The above sequence may be performed in a certain period of time, for example, on the order of a few milliseconds or longer. The devices 202 in range of each other may form a network cluster. Then, a centralized data aggregator, that may be one of the networked devices 202 that has sufficient computational capability, a server 206 in the cloud 200, or a central network controller associated with the cluster, performs an RFI analysis on the victims' data collectively. This RFI analysis may, for example, determine which devices are interfering with which others, and what the nature and extent of the RFI is within the system.

Based on this analysis, corrective action may be taken, including at least one of (in approximate order of impact): (1) notifying an interfering device (and network administrator), (2) recommending a revision to the RFI attacking device transmit behavior, (e.g., lower signal intensity, or adjust other transmit characteristics (frequency band, protocol, transmit timing, etc.), (3) recommending a revision to the RFI receiving device's behavior (for example, do not operate in the observed sensitive states (e.g., at a low voltage or a high frequency) as determined by the test protocol), which may be recommender enforced, or (4) taking down an offending attacker device, or a particularly sensitive victim device, and informing the network administrator. The last action is severe, but may be applicable in mission critical situations, e.g., devices with safety risks, medical devices (life support, MRI, defibrillators, and pacemakers), and traffic prioritization (ambulance over passenger cars), and so on.

Figure 4:
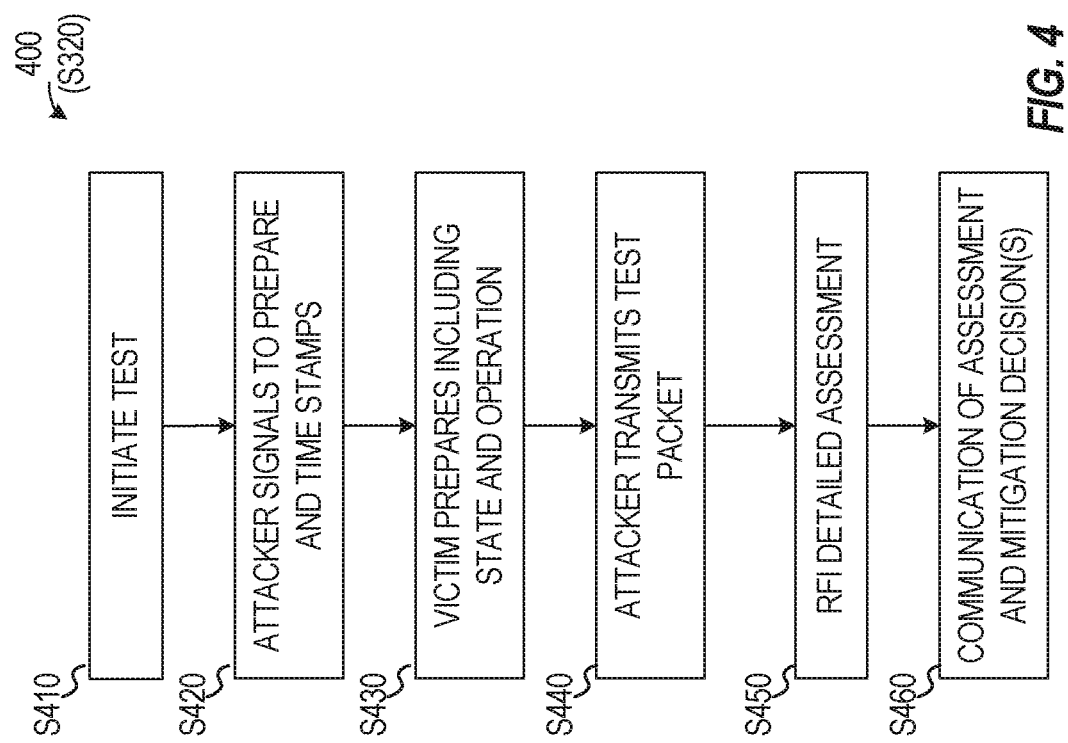
FIG. 4 illustrates a flowchart of an implementation of a process flow for RFI assessment process, according to an example.

FIG. 4 is a flowchart of an implementation that summarizes an example of this protocol/process 400 (320), i.e., the RFI test sequence for assessment of RFI on the network. In operation S410, the RFI assessment 400 is initiated. The RFI assessment 400 may be initiated for several reasons, including, in an implementation, at least one of: 1) at scheduled times, 2) triggered by new devices joining the network, or 3) triggered by a threshold for suspected RFI based on the behavior and errors of individual, potentially victim, devices.

In operation S420, the attacker device 202 prepares and transmits an interference test packet, such as the example test packet in Table 1. This interference test packet notifies receiver devices 202 to prepare for an interference test pattern that will be sent according to the parameters in the interference test packet. Upon receipt of the interference test packet, in operation S430, the victim prepares for receipt of the interference test pattern at the time indicated in the interference test packet. This preparation may include readying software that may be used to measure an error rate of the transmitted interference test pattern.

In operation S440, the attacker device 202 transmits the interference test pattern at the time indicated in the prior interference test packet. The victim device 202 receives the interference test pattern, compares it with the interference test pattern type that was transmitted in the interference test packet, and determines an error rate, which may be determined by comparing the actual received interference test pattern with the expected interference test pattern. The victim device 202 then saves any relevant information related to the actual received interference test pattern, and may associate its own network identifier as an originator of the relevant information. Information from the prior interference test packet may also be included in the relevant information that is saved. Operations S420-S440 may be repeated for each and every predetermined combination of attack devices 202 and victim devices 202, with test results being stored. Once all predetermined combinations have been executed, in operation S450, an RFI detailed assessment may take place in which the stored test results may be analyzed holistically to make determinations about mitigation decisions. In operation S460, the results of the assessment are communicated to various devices 202 and mitigation decisions may be made to modify operation of the network or devices in the network in order to reduce interference.

The following describes an implementation of RFI mitigation pairwise in a network of N devices (and describes how to mitigate RFI collectively in a network of many devices). FIGS. 5A-F are block diagrams showing multiple devices 202 in example pairwise combinations of transmitting devices in a network cluster of N=4 devices 202, choosing k=2 pairs means that there are six combinations (i.e., four choosing two results in six possible combinations).

In FIGS. 5A-F, pairs of attackers are formed from all pairwise combinations of devices 202 in the network cluster to enable assessment of "second order" multiple device RFI. In this implementation, all combinations of pairs of devices 202 in the network cluster schedule to transmit (as attackers) at the same time in the future, while the other devices 202 in the network cluster attempt to receive (as the victims) at this scheduled time. The signal packet received by each victim 202 may be compared to the known patterns transmitted by each attacker in order to infer the error rate, and determine qualitatively and quantitatively which devices 202 are interfering with which other devices 202, and to what extent. All pairs of N devices scale as N choosing 2 computationally, e.g.

$$\binom{N}{2}.$$

In FIG. 5A, devices #1, 2 are operated as transmitters in transmit mode, and devices #3, 4 are operated as receivers in receive mode. In FIG. 5B, devices #1, 3 are operated as transmitters in transmit mode, and devices #2, 4 are operated as receivers in receive mode. In FIG. 5C, devices #1, 4 are operated as transmitters in transmit mode, and devices #2, 3 are operated as receivers in receive mode. In FIG. 5D, devices #2, 3 are operated as transmitters in transmit mode, and devices #1, 4 are operated as receivers in receive mode. In FIG. 5E, devices #2, 4 are operated as transmitters in transmit mode, and devices #1, 3 are operated as receivers in receive mode. In FIG. 5F, devices #3, 4 are operated as transmitters in transmit mode, and devices #1, 2 are operated as receivers in receiver mode. Thus, each of the combinations of transmit and receive for N devices choosing 2 are accounted for.

More generally, for higher order effects, the same procedure may be applied to combinations of N choosing k, e.g., $$\binom{N}{k},$$

where k≤N. This procedure may generate a rank ordering of which devices are interfering with which, quantified by error rate between known expected transmitters and each of the receivers.

TABLE 2

Table with Error Rate Values from FIGS. 5A-5F Combinations
E.g., N = 4 devices, k = 2 devices transmitting simultaneously at a given time Error Rate Normalized [0 = no reception, 1 = perfect reception]

| C | TX-Pair (A, B) | RX#1 from A | RX#1 from B | RX#2 from A | RX#2 from B | RX#3 from A | RX#3 from B | RX#4 from A | RX#4 from B |
|---|---|---|---|---|---|---|---|---|---|
| 1 | (TX#1, TX#2) | NA | NA | NA | NA | 0.9 | 0.89 | 0.7 | 0.8 |
| 2 | (TX#1, TX#3) | NA | NA | 0.95 | 0.9 | NA | NA | 0.2 | 0.99 |
| 3 | (TX#1, TX#4) | NA | NA | 0.93 | 0.4 | 0.7 | 0.99 | NA | NA |
| 4 | (TX#2, TX#3) | 0.75 | 0.65 | NA | NA | NA | NA | 0.4 | 0.94 |
| 5 | (TX#2, TX#4) | 0.8 | 0.65 | NA | NA | 0.5 | 0.99 | NA | NA |
| 6 | (TX#3, TX#4) | 0.7 | 0.6 | 0.72 | 0.7 | NA | NA | NA | NA |

Table 2 illustrates an example of data (normalized error rates) that may be generated as a result of executing the process for each of the combinations of devices. In this Table, a value of 0 represents no reception, and a value of 1 represents perfect reception based on reception by each receiver due to each transmitter, for N=4 devices choosing k=2 devices, transmitting simultaneously at a time. For example, in Combination 3, because Device #4 is in transmitting mode and in close spatial proximity to Device #3 in receive mode, reception by receiving Device #3 from transmitting Device #4 is much stronger than reception Device #3 of the signal transmitted from transmitting Device #1. Error rates may be calculated by differences between known expected Interference Test Patterns and the signal actually received by each receiving device 202.

In the above case, four devices taken two at a time, it is possible to test out each possible combination. In general, however, as the number of devices N in a network becomes large, the number of possible combinations becomes quite large as well, and it may become too difficult from a resource standpoint to test each and every possible combination, particularly when the value of k increases beyond two or three. Therefore, some heuristics or other intelligent rules may be applied to help reduce the number of combinations. For example, when two devices are distant from one another and their output power is low, the chance of interference may be small, and therefore a test involving a combination of these two devices themselves may not be that valuable and thus such a combination may be omitted. Similarly, if a device is active very infrequently (e.g., a fire alarm), it may be excluded from testing as well.

Response (S330)

Returning to the discussion of FIG. 3, the response S330 to the RFI assessment S320 may be provided in the form of mitigation techniques that may be applied, for example, by minimizing a cost function. Various cost functions are possible, including: 1) minimizing the RFI based on device 202 priority (e.g., a medical imaging device has priority over cellphone or wireless printer in near proximity); 2) minimizing an overall power of the network cluster (e.g., iteratively adjust the transmit power of each device, starting with the worst interferers, to minimize the overall transmit power of the network); 3) minimizing an overall frequency band utilization of the network cluster (devices 202 in nearest proximity to one another are directed to use different frequency bands or are synchronized to transmit on time-sharing basis, or to avoid bands where interference is detected external to the network cluster); and 4) minimizing an overall RFI (e.g., if one device is causing RFI to all others, then direct just that device 202 to: a) turn off; b) reduce its power level; c) change its frequency band; or d) take some other action to minimize its interference).

With regard to minimizing RFI based on device 202 prioritization, the RFI assessment may be processed (with some functions possibly being performed in a peer-to-peer manner among the devices in the network, and other functions being performed externally by edge or cloud resources) to calculate, in an example implementation, a "Time-Ordered-Spectral-Spatial-Power Allocation Table" (TOSSPAT) for each device 202 in the network. This RFI operation in the network may be loosely analogized to the lymphatic system in a human body in that it is operative throughout the network and can help rid the network of harmful effects of RFI. A device designated as an RFI controller may collect the relevant RFI information and make the determinations about the ordering of priority for communications and the best way to minimize the RFI, although it is also possible that a set of agreed-to peer-to-peer rules may achieve the same result.

The TOSSPAT indicates, for each device, transmission time windows into the future that each device will operate during, including power and spectral utilization (optionally including spatial directionality of radiation pattern/orientation), organized to minimize RFI to top priority communications. An example is shown in Table 3 below (but illustrating only a crude priority).

TABLE 3

Example of a Time-Ordered-Spectral-Spatial-Power Allocation Table (TOSSPAT)

| Time-Step | 0 | 1 | 2 | 3 | . | . | . | inf |
|---|---|---|---|---|---|---|---|---|
| Device 0 | | TP | TP | | | | | |
| Device 1 | | | TP | TP | TP | | | |
| Device 2 | Top-Priority (TP) | | | | | | TP | TP |
| . | | | | | | | | |
| . | | | | | | | | |
| . | | | | | | | | |
| Device N | | | Low-Priority (LP) | | | | | |

In the example table of Table 3, each row pertains to one device 202 in the network, and each column pertains to a time slot in which a transmission is to occur. Although the cells shown in Table 3 only illustrate the priority of a particular device during a time slot, the cells can include other information, such as power, spatial, spectral utilization, and other related information for transmission and reception planned in the future. The TOSSPAT may be provided throughout the network via a broadcast of metadata as to an expected state each IoT device is to take in the near future. Any length of time may be used for the time slots, depending on the particulars of the application. The time slots may be on the order of milliseconds for some applications, up to seconds, minutes, or longer for others (advance knowledge for RFI events such as solar flares may be known and planned for days in advance). The information in the TOSSPAT may cause a device to revise receive or transmit behavior in the ways described above, including causing the device to remain silent during observed sensitive states.

Advantageously, use of the TOSSPAT allows a change in future communication patterns throughout the network that may permit a more efficient operation of the network. The TOSSPAT may indicate an operating state of each device 202 in the near future, and may be broadcast to other devices 202 in the form of metadata as to what each device is planning (based either on its own determination based on an agreed-to set of rules by peers, or on an instruction it has received from an RFI controller that maintains a centralized determination—or some combination of both) to do when in the future.

This design is advantageous over passive network monitoring in which a check is made if a band is being utilized before broadcasting on top of it, and if so, then choosing an empty band. The present implementation is more predictive in nature because devices 202 are announcing what they will do in the future, allowing other devices 202 to take actions to prioritize or favor the indications in the TOSSPAT. External RFI may interrupt the plans in the TOSSPAT. For example, an IoT device 202 intends to use a portion of the spectrum at a particular time slot in the future. However, at the intended time slot, this time slot is actually occupied by an external device—the detection of which may trigger a new RFI Assessment S320.

The approach described above may even handle a situation where there are multiple Priority-1 (high priority) devices 202 seeking to transmit—in such a situation, this may be handled, for example, by prioritizing: the shortest packet to be sent, some attribute of the data itself, or some attribute of the network. The TOSSPAT may include a data protocol priority field that may be useful in helping to prioritize multiple Priority-1 devices 202. Each device 202 may set their own priority, but the protocol may allow this value to be overwritten by system management (whether it is implemented peer-to-peer, centrally located, etc.). The initial priority may be provided by a device manufacturer or initially assigned by a network administrator or control software upon installation or device startup. For example, medical devices or medical vehicles could be assigned to be top priority (Priority-1), whereas computer peripherals (e.g., wireless printers) could be low priority (Priority-5). The handling of multiple devices with the highest priority means that there must be a prioritization taking place within this top-priority group.

To illustrate a such a case, the following is provided. An IoT network consists of only three devices 202, each of which is Priority-1. If all three seek to transmit simultaneously, it is possible that no signals get through due to RFI, and some form of sub-prioritization may take place. One solution in this situation is to delay transmission in one or more of the devices 202, which may allow the other two devices 202 to operate without interference. The decision on which device to delay in this situation may be based on, for example, signaling the device 202 having a shorter duration transmission packet to transmit first. This most quickly mitigates the RFI contention in time. The same concept applies to more than three devices. If there is other information about relative RFI between the devices, for example, based on device physical distances from each other, then that may be accounted for in the sub-prioritization. If there is no other discrimination in priority, the device's sub-priority transmit order may be set randomly.

Latency and Predictive Models

Digital communications may have inherent latency in responding to interference. By way of example, interference between a diesel truck (engine noise, citizens band radio and other RF transmissions) and a digital television (TV) is considered, where the truck approaches the digital TV. Well known analysis techniques, such as a Kalman or particle filter may be applied to a recursive state estimation of the truck's GPS location at different points in time.

The Kalman filter is a popular method of recursive state estimation that finds wide application in signal processing. Given a history of measurements, a Kalman filter may be used to build a model for the state of a system that maximizes the a posteriori (i.e., in hindsight) probability of prior measurements. Furthermore, the entire history of measurements may be condensed such that the state at time k can be modeled in terms of only the prior state at time k−1. The assumption for the Kalman filter is that the system is linear and subject only to white Gaussian noise. Nonlinear systems may be handled with implementation of the more sophisticated particle filter.

When applied to RFI mitigation, the state variables of interest may include spatial location/proximity, power level, error correction level, noise filters, preamplifier requirements, orientation/directionality of radiation pattern, signal priority (which may change as function of time), etc. Each state variable may be predicted to guide future state transitions in order to collectively minimize RFI in a network of devices.

In addition to predictive mechanisms, there are also situations where more definitive information might be known and may be used. In the truck example discussed above, actual routing information of the truck could be obtained from the truck or routing management software for the truck, and certain types of RFI information may be known. The digital TV may be notified of the truck path and timing (regardless of whether this is predictively determined or determined in some other way)—and possibly of the truck's known or estimated RFI characteristics (impacted frequencies, strength, burst durations, etc.). RFI may be mitigated as the truck approaches by at least one of the following techniques: 1) the transmitting device could mitigate its RFI emission (e.g., by reducing the engine speed, radio transmissions, or other activities that may generate RFI); or 2) the receiving device could take action to accept the RFI (boost error correction or prepare DSP filters to reject the specific noise signature expected to occur shortly in future). These mitigating activities could be reversed as the truck recedes from the digital TV.

A more practical example might be similar to the above, but with the "RFI noisy" truck entering a metropolitan area. The presence of a single digital TV might not be enough to have the truck take mitigating actions—however, the presence of fifty digital TVs within a quarter mile radius might be enough to require the truck to take mitigating actions. Thus, some sort of agreed to rules or voting could be implemented to determine the nature of the mitigating actions.

Also, mitigation of harmful interference from devices external to the network on those internal to the network may be achieved by performing a spectral analysis and triangulation. Smart devices 202 in the network cluster can adapt not to interfere with nearby dumb devices 202, so that IoT adoption benefits both smart (generally meaning having autonomous computational capabilities) and dumb devices 202 (generally meaning capable of limited computation driven by other devices). This approach may therefore benefit legacy networks as well.

Thus, networked wireless systems that may be utilized in IoT applications may benefit if electronic devices in proximity to one another share information and coordinate with respect to various parameters. These parameters may include signal strength received, power level emitted, packet size and number of packets, frequency band utilization, error rate, etc. Such a system of networked devices may actively plan to collectively minimize overall harmful interference by: first determining which devices are interfering with one another and quantification of the extent of harmful interference, and second taking collective action to minimize harmful interference among all the devices participating in the network as a whole. Operating in this manner may improve the overall safety of the IoT system and provide other benefits.

Figure 6:
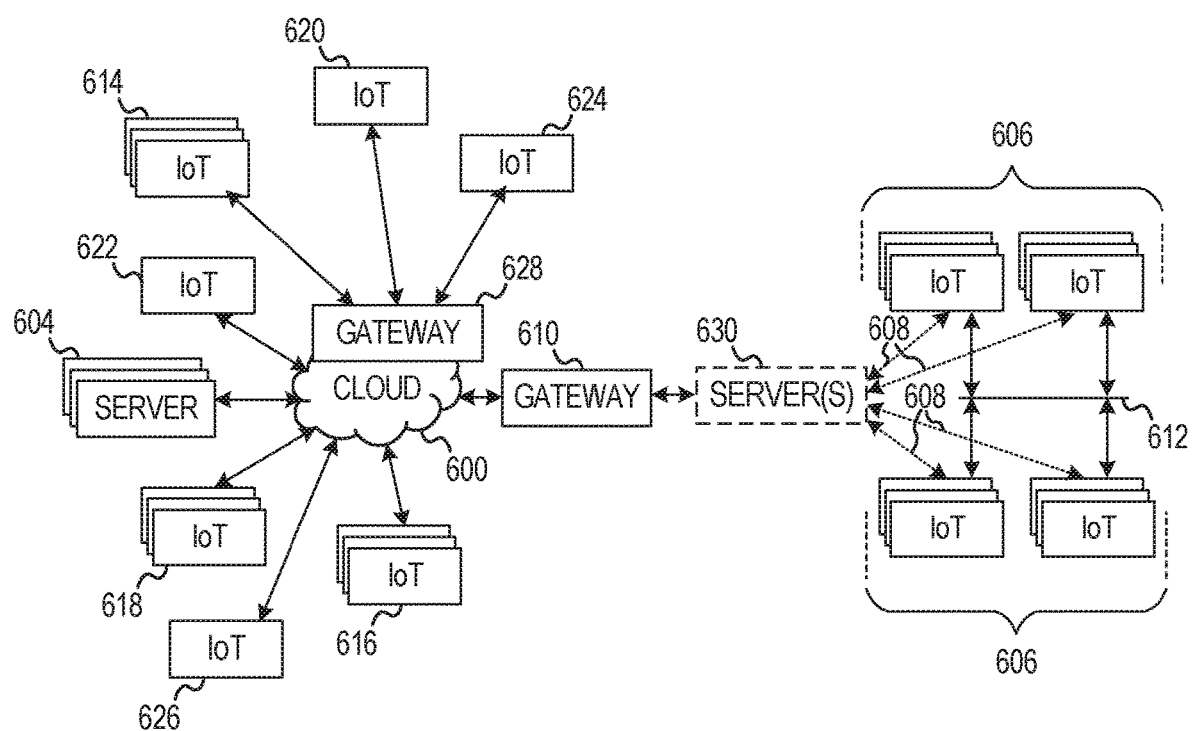
FIG. 6 illustrates a block diagram of a network illustrating communications among a number of IoT devices, according to an example.

FIG. 6 illustrates a drawing of a cloud computing network, or cloud 600, in communication with a number of Internet of Things (IoT) devices. The cloud 600 may represent the Internet, or may be a local area network (LAN), or a wide area network (WAN), such as a proprietary network for a company. The IoT devices may include any number of different types of devices, grouped in various combinations. For example, a traffic control group 606 may include IoT devices along streets in a city. These IoT devices may include stoplights, traffic flow monitors, cameras, weather sensors, and the like. The traffic control group 606, or other subgroups, may be in communication with the cloud 600 through wired or wireless links 608, such as LPWA links, optical links, and the like. Further, a wired or wireless sub-network 612 may allow the IoT devices to communicate with each other, such as through a local area network, a wireless local area network, and the like. The IoT devices may use another device, such as a gateway 610 or 628 to communicate with remote locations such as the cloud 600; the IoT devices may also use one or more servers 630 to facilitate communication with the cloud 600 or with the gateway 610. For example, the one or more servers 630 may operate as an intermediate network node to support a local edge cloud or fog implementation among a local area network. Further, the gateway 628 that is depicted may operate in a cloud-to-gateway-to-many edge devices configuration, such as with the various IoT devices 614, 620, 624 being constrained or dynamic to an assignment and use of resources in the cloud 600.

Other example groups of IoT devices may include remote weather stations 614, local information terminals 616, alarm systems 618, automated teller machines 620, alarm panels 622, or moving vehicles, such as emergency vehicles 624 or other vehicles 626, among many others. Each of these IoT devices may be in communication with other IoT devices, with servers 604, with another IoT fog device or system (not shown, but depicted in FIG. 2), or a combination therein. The groups of IoT devices may be deployed in various residential, commercial, and industrial settings (including in both private or public environments).

As can be seen from FIG. 6, a large number of IoT devices may be communicating through the cloud 600. This may allow different IoT devices to request or provide information to other devices autonomously. For example, a group of IoT devices (e.g., the traffic control group 606) may request a current weather forecast from a group of remote weather stations 614, which may provide the forecast without human intervention. Further, an emergency vehicle 624 may be alerted by an automated teller machine 620 that a burglary is in progress. As the emergency vehicle 624 proceeds towards the automated teller machine 620, it may access the traffic control group 606 to request clearance to the location, for example, by lights turning red to block cross traffic at an intersection in sufficient time for the emergency vehicle 624 to have unimpeded access to the intersection.

Clusters of IoT devices, such as the remote weather stations 614 or the traffic control group 606, may be equipped to communicate with other IoT devices as well as with the cloud 600. This may allow the IoT devices to form an ad-hoc network between the devices, allowing them to function as a single device, which may be termed a fog device or system (e.g., as described above with reference to FIG. 2).

Figure 7:
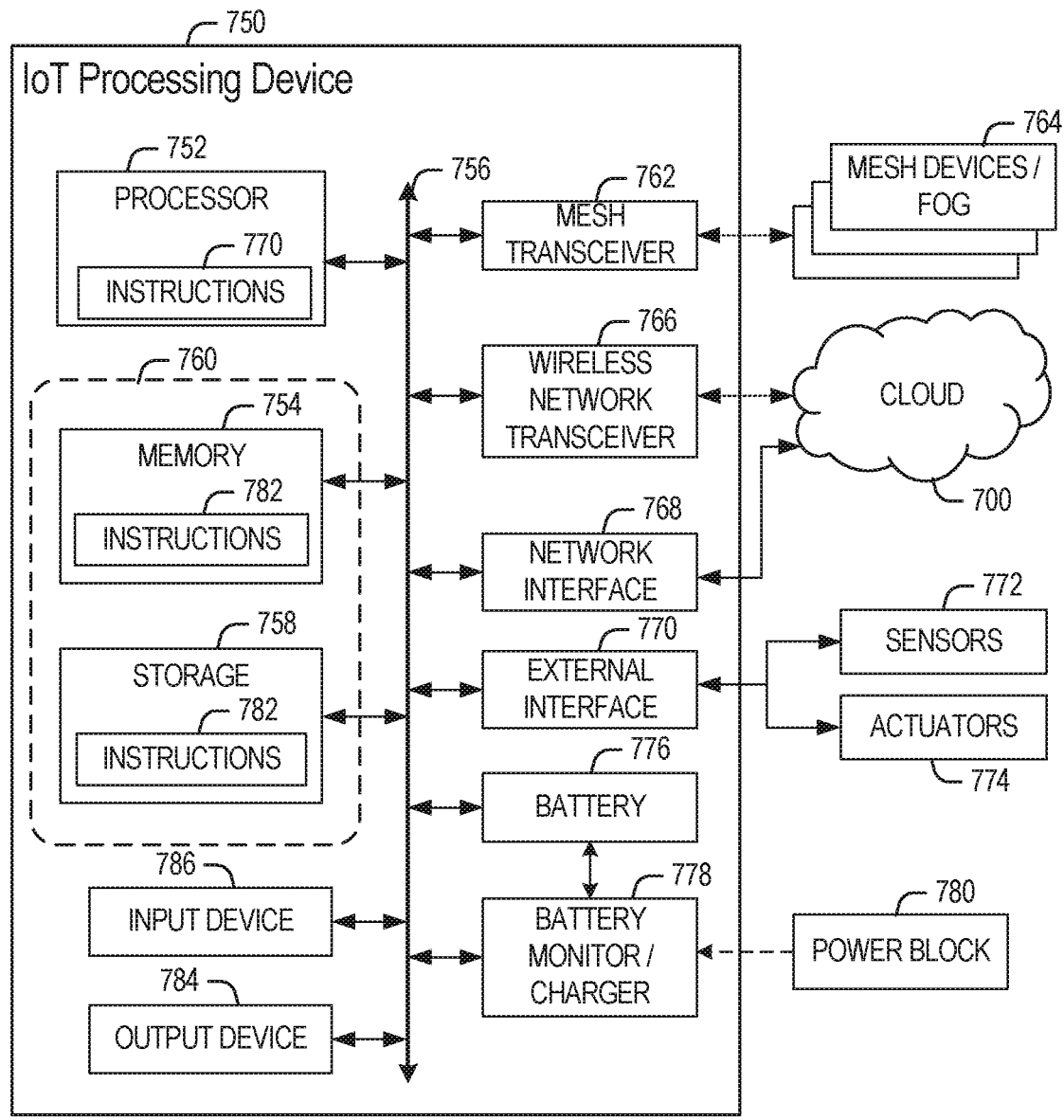
FIG. 7 illustrates a block diagram for an example IoT processing system architecture upon which any one or more of the techniques (e.g., operations, processes, methods, and methodologies) discussed herein may be performed, according to an example.

FIG. 7 is a block diagram of an example of components that may be present in an IoT device 750 for implementing the techniques described herein. The IoT device 750 may include any combinations of the components shown in the example or referenced in the disclosure above. The components may be implemented as ICs, portions thereof, discrete electronic devices, or other modules, logic, hardware, software, firmware, or a combination thereof adapted in the IoT device 750, or as components otherwise incorporated within a chassis of a larger system. Additionally, the block diagram of FIG. 7 is intended to depict a high-level view of components of the IoT device 750. However, some of the components shown may be omitted, additional components may be present, and different arrangement of the components shown may occur in other implementations.

The IoT device 750 may include a processing circuitry (the processing circuitry may also be referred to herein as a processor) 752, which may be a microprocessor, a multi-core processor, a multithreaded processor, an ultra-low voltage processor, an embedded processor, or other known processing element. The processor 752 may be a part of a system on a chip (SoC) in which the processor 752 and other components are formed into a single integrated circuit, or a single package, such as the Edison™ or Galileo™ SoC boards from Intel. As an example, the processor 752 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 752 may communicate with a system memory 754 over an interconnect 756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (QDP). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example the storage 758 may be implemented via a solid state disk drive (SSDD). Other devices that may be used for the storage 758 include flash memory cards, such as SD cards, microSD cards, xD picture cards, and the like, and USB flash drives. In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in a SoC based system. Other bus systems may be included, such as an I2C interface, an SPI interface, point to point interfaces, and a power bus, among others.

The interconnect 756 may couple the processor 752 to a mesh transceiver 762, for communications with other mesh devices 764. The mesh transceiver 762 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 764. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 762 may communicate using multiple standards or radios for communications at different range. For example, the IoT device 750 may communicate with close devices, e.g., within about 10 meters, using a local transceiver based on BLE, or another low power radio, to save power. More distant mesh devices 764, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 766 may be included to communicate with devices or services in the cloud 700 via a local or wide area network protocols. The wireless network transceiver 766 may be a LPWA transceiver that follows the IEEE 802.15.4, or IEEE 802.15.4g standards, among others. The IoT device 750 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 762 and wireless network transceiver 766, as described herein. For example, the radio transceivers 762 and 766 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 762 and 766 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 766, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 768 may be included to provide a wired communication to the cloud 700 or to other devices, such as the mesh devices 764. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to allow connect to a second network, for example, a NIC 768 providing communications to the cloud over Ethernet, and a second NIC 768 providing communications to other devices over another type of network.

The interconnect 756 may couple the processor 752 to an external interface 770 that is used to connect external devices or subsystems. The external devices may include sensors 772, such as accelerometers, level sensors, flow sensors, optical light sensors, camera sensors, temperature sensors, a global positioning system (GPS) sensors, pressure sensors, barometric pressure sensors, and the like. The external interface 770 further may be used to connect the IoT device 750 to actuators 774, such as power switches, valve actuators, an audible sound generator, a visual warning device, and the like.

In some optional examples, various input/output (I/O) devices may be present within, or connected to, the IoT device 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 750.

A battery 776 may power the IoT device 750, although in examples in which the IoT device 750 is mounted in a fixed location, it may have a power supply coupled to an electrical grid. The battery 776 may be a lithium ion battery, or a metal-air battery, such as a zinc-air battery, an aluminum-air battery, a lithium-air battery, and the like.

A battery monitor/charger 778 may be included in the IoT device 750 to track the state of charge (SoCh) of the battery 776. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 778 may communicate the information on the battery 776 to the processor 752 over the interconnect 756. The battery monitor/charger 778 may also include an analog-to-digital (ADC) convertor that allows the processor 752 to directly monitor the voltage of the battery 776 or the current flow from the battery 776. The battery parameters may be used to determine actions that the IoT device 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the IoT device 750. A wireless battery charging circuit, such as an LTC4020 chip from Linear Technologies of Milpitas, Calif., among others, may be included in the battery monitor/charger 778. The specific charging circuits chosen depend on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine readable medium 760 including code to direct the processor 752 to perform electronic operations in the IoT device 750. The processor 752 may access the non-transitory, machine readable medium 760 over the interconnect 756. For instance, the non-transitory, machine readable medium 760 may be embodied by devices described for the storage described above, or may include specific storage units such as optical disks, flash drives, or any number of other hardware devices. The non-transitory, machine readable medium 760 may include instructions to direct the processor 752 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus for assessing and mitigating radio frequency interference (RFI) in a network comprising a plurality of wireless devices, the apparatus comprising: memory; and processing circuitry coupled to the memory, the processing circuitry to: during an RFI assessment phase: receive an attacker signal to operate as an attacker device; respond to the attacker signal by causing the processing circuitry to: transmit a transmitted interference test packet (ITPkt) to one or more other wireless devices of the plurality of wireless devices, wherein the transmitted ITPkt comprises ITPkt parameters comprising: a network identifier of the device, a transmission globally unique identifier, and a time of transmission for a transmitted interference test pattern (ITPat); and transmit the transmitted ITPat at the time of transmission for the transmitted ITPat.

In Example 2, the subject matter of Example 1 includes, wherein the processing circuitry is further to: during the RFI assessment phase: receive a victim signal to operate as a victim device; respond to the victim signal by causing the processing circuitry to: receive a received interference test packet (ITPkt) from one or more other wireless devices of the plurality of wireless devices, wherein the received ITPkt comprises the ITPkt parameters; prepare for reception of a received ITPat at the time of transmission for the transmitted ITPat; receive the received ITPat at the time of transmission for the transmitted ITPat; assess a communication metric of the received ITPat; and store the communication metric in a memory of the apparatus.

In Example 3, the subject matter of Example 2 includes, wherein the communication metric is an error rate of the received ITPat.

In Example 4, the subject matter of Example 3 includes, wherein the processing circuitry is further to determine the error rate by a comparison of the received ITPat with a predetermined ITPat.

In Example 5, the subject matter of Examples 2-4 includes, wherein the processing circuitry is further to: send a response containing the communication metric or a value derived therefrom to a sender of the received ITPat or a centralized data aggregator.

In Example 6, the subject matter of Examples 1-5 includes, wherein the processing circuitry is further to:

during a mitigation phase: receive information from a centralized data aggregator (CDA).

In Example 7, the subject matter of Example 6 includes, wherein the information from the CDA comprises a table comprising future transmission in formation of the device in time slots.

In Example 8, the subject matter of Examples 6-7 includes, taking an action to mitigate RFI in the network.

In Example 9, the subject matter of Example 8 includes, wherein the action to mitigate RFI comprises causing the processor to revise a transmit behavior.

In Example 10, the subject matter of Example 9 includes, wherein the revision of the transmit behavior comprises causing the processor to perform at least one of lower a transmit signal intensity, adjust a transmit frequency band, adjust a transmit protocol, or adjust a transmit timing.

In Example 11, the subject matter of Examples 8-10 includes, wherein the action to mitigate RFI comprises causing the processor to revise receive or transmit behavior.

In Example 12, the subject matter of Example 11 includes, wherein the revision of the receive or transmit behavior comprises causing the processor to cause the device to remain silent during observed sensitive states.

In Example 13, the subject matter of Examples 1-12 includes, wherein the ITPkt further comprises a test pattern type that identifies the contents of the ITPat.

In Example 14, the subject matter of Example 13 includes, wherein the ITPkt further comprises a power level, a frequency or frequency band, map location, and an orientation of the antenna and radiation pattern directionality.

In Example 15, the subject matter of Examples 1-14 includes, wherein the transmission of the attacker ITPkt is transmitted as a broadcast.

In Example 16, the subject matter of Example 15 includes, wherein the processing circuitry is further to vary signal directionality during the transmission of the attacker ITPkt.

Example 17 is a method for assessing and mitigating radio frequency interference (RFI) in a network comprising a plurality of wireless devices, the method comprising performing, by a processor of an apparatus that is one of the plurality of wireless devices: during an RFI assessment phase: receiving an attacker signal to operate as an attacker device; responding to the attacker signal by: transmitting a transmitted interference test packet (ITPkt) to one or more other wireless devices of the plurality of wireless devices, wherein the transmitted ITPkt comprises ITPkt parameters comprising: a network identifier of the device, a transmission globally unique identifier, and a time of transmission for a transmitted interference test pattern (ITPat); and transmitting the transmitted ITPat at the time of transmission for the transmitted ITPat.

In Example 18, the subject matter of Example 17 includes, performing, by the processor: during the RFI assessment phase: receiving a victim signal to operate as a victim device; responding to the victim signal by: receiving a received interference test packet (ITPkt) from one or more other wireless devices of the plurality of wireless devices, wherein the received ITPkt comprises the ITPkt parameters; preparing for reception of a received ITPat at the time of transmission for the transmitted ITPat; receiving the received ITPat at the time of transmission for the transmitted ITPat; assessing a communication metric of the received ITPat; and storing the communication metric in a memory of the apparatus.

In Example 19, the subject matter of Example 18 includes, wherein the communication metric is an error rate of the received ITPat.

In Example 20, the subject matter of Example 19 includes, determining the error rate by comparing the received ITPat with a predetermined ITPat.

In Example 21, the subject matter of Examples 18-20 includes, sending a response containing the communication metric or a value derived therefrom to a sender of the received ITPat or a centralized data aggregator.

In Example 22, the subject matter of Examples 17-21 includes, performing, by the processor: during a mitigation phase: receiving information from a centralized data aggregator (CDA).

In Example 23, the subject matter of Example 22 includes, wherein the information from the CDA comprises a table comprising future transmission in formation of the device in time slots.

In Example 24, the subject matter of Examples 22-23 includes, taking an action to mitigate RFI in the network.

In Example 25, the subject matter of Example 24 includes, wherein the action to mitigate RFI comprises revising receive or transmit behavior.

In Example 26, the subject matter of Example 25 includes, wherein the revising of the receive or transmit behavior comprises at least one of lowering transmit signal intensity, adjusting a transmit frequency band, adjusting a transmit protocol, or adjusting a transmit timing.

In Example 27, the subject matter of Examples 24-26 includes, wherein the action to mitigate RFI comprises revising receive or transmit behavior.

In Example 28, the subject matter of Example 27 includes, wherein the revising of the receive or transmit behavior comprises causing the device to remain silent during observed sensitive states.

In Example 29, the subject matter of Examples 17-28 includes, wherein the ITPkt further comprises a test pattern type that identifies the contents of the ITPat.

In Example 30, the subject matter of Example 29 includes, wherein the ITPkt further comprises a power level, a frequency or frequency band, map location, and an orientation of the antenna and radiation pattern directionality.

In Example 31, the subject matter of Examples 17-30 includes, wherein the transmitting of the attacker ITPkt is transmitted as a broadcast.

In Example 32, the subject matter of Example 31 includes, varying signal directionality while transmitting of the attacker ITPkt.

Example 33 is a computer program product comprising one or more computer readable storage media comprising computer-executable instructions operable to, when executed by processing circuitry of an apparatus for assessing and mitigating radio frequency interference (RFI) in a network, cause the apparatus to: during an RFI assessment phase: receive an attacker signal to operate as an attacker device; respond to the attacker signal by causing the processing circuitry to: transmit a transmitted interference test packet (ITPkt) to one or more other wireless devices of the plurality of wireless devices, wherein the transmitted ITPkt comprises ITPkt parameters comprising: a network identifier of the device, a transmission globally unique identifier, and a time of transmission for a transmitted interference test pattern (ITPat); and transmit the transmitted ITPat at the time of transmission for the transmitted ITPat.

In Example 34, the subject matter of Example 33 includes, wherein the processing circuitry is further to: during the RFI assessment phase: receive a victim signal to operate as a victim device; respond to the victim signal by causing the processing circuitry to: receive a received interference test packet (ITPkt) from one or more other wireless devices of the plurality of wireless devices, wherein the received ITPkt comprises the ITPkt parameters; prepare for reception of a received ITPat at the time of transmission for the transmitted ITPat; receive the received ITPat at the time of transmission for the transmitted ITPat; assess a communication metric of the received ITPat; and store the communication metric in a memory of the apparatus.

In Example 35, the subject matter of Example 34 includes, wherein the communication metric is an error rate of the received ITPat.

In Example 36, the subject matter of Example 35 includes, wherein the processing circuitry is further to determine the error rate by a comparison of the received ITPat with a predetermined ITPat.

In Example 37, the subject matter of Examples 34-36 includes, wherein the processing circuitry is further to: send a response containing the communication metric or a value derived therefrom to a sender of the received ITPat or a centralized data aggregator.

In Example 38, the subject matter of Examples 33-37 includes, wherein the processing circuitry is further to: during a mitigation phase: receive information from a centralized data aggregator (CDCRM).

In Example 39, the subject matter of Example 38 includes, wherein the information from the CDCRM comprises a table comprising future transmission in formation of the device in time slots.

In Example 40, the subject matter of Examples 38-39 includes, taking an action to mitigate RFI in the network.

In Example 41, the subject matter of Example 40 includes, wherein the action to mitigate RFI comprises causing the processor to revise a receive or transmit behavior.

In Example 42, the subject matter of Example 41 includes, wherein the revision of the receive or transmit behavior comprises causing the processor to perform at least one of lower a transmit signal intensity, adjust a transmit frequency band, adjust a transmit protocol, or adjust a transmit timing.

In Example 43, the subject matter of Examples 40-42 includes, wherein the action to mitigate RFI comprises causing the processor to revise receive behavior.

In Example 44, the subject matter of Example 43 includes, wherein the revision of the receive behavior comprises causing the processor to cause the device to remain silent during observed sensitive states.

In Example 45, the subject matter of Examples 33-44 includes, wherein the ITPkt further comprises a test pattern type that identifies the contents of the ITPat.

In Example 46, the subject matter of Example 45 includes, wherein the ITPkt further comprises a power level, a frequency or frequency band, map location, and an orientation of the antenna and radiation pattern directionality.

In Example 47, the subject matter of Examples 33-46 includes, wherein the transmission of the attacker ITPkt is transmitted as a broadcast.

In Example 48, the subject matter of Example 47 includes, wherein the processing circuitry is further to vary signal directionality during the transmission of the attacker ITPkt.

Example 49 is an apparatus for assessing and mitigating radio frequency interference (RFI) in a network comprising a plurality of wireless devices, the apparatus comprising: during an RFI assessment phase: means for receiving an attacker signal to operate as an attacker device; means for responding to the attacker signal by: transmitting a transmitted interference test packet (ITPkt) to one or more other wireless devices of the plurality of wireless devices, wherein the transmitted ITPkt comprises ITPkt parameters comprising: a network identifier of the device, a transmission globally unique identifier, and a time of transmission for a transmitted interference test pattern (ITPat); and transmitting the transmitted ITPat at the time of transmission for the transmitted ITPat.

In Example 50, the subject matter of Example 49 includes, during the RFI assessment phase: means for receiving a victim signal to operate as a victim device; means for responding to the victim signal by: receiving a received interference test packet (ITPkt) from one or more other wireless devices of the plurality of wireless devices, wherein the received ITPkt comprises the ITPkt parameters; preparing for reception of a received ITPat at the time of transmission for the transmitted ITPat; receiving the received ITPat at the time of transmission for the transmitted ITPat; assessing a communication metric of the received ITPat; and storing the communication metric in a memory of the apparatus.

In Example 51, the subject matter of Example 50 includes, wherein the communication metric is an error rate of the received ITPat.

In Example 52, the subject matter of Example 51 includes, means for determining the error rate by comparing the received ITPat with a predetermined ITPat.

In Example 53, the subject matter of Examples 50-52 includes, means for sending a response containing the communication metric or a value derived therefrom to a sender of the received ITPat or a centralized data aggregator.

In Example 54, the subject matter of Examples 49-53 includes, during a mitigation phase: means for receiving information from a centralized data aggregator (CDA).

In Example 55, the subject matter of Example 54 includes, wherein the information from the CDA comprises a table comprising future transmission in formation of the device in time slots.

In Example 56, the subject matter of Examples 54-55 includes, taking an action to mitigate RFI in the network.

In Example 57, the subject matter of Example 56 includes, wherein the action to mitigate RFI comprises revising transmit behavior.

In Example 58, the subject matter of Example 57 includes, wherein the revising of the transmit behavior comprises at least one of lowering transmit signal intensity, adjusting a transmit frequency band, adjusting a transmit protocol, or adjusting a transmit timing.

In Example 59, the subject matter of Examples 56-58 includes, wherein the action to mitigate RFI comprises revising receive or transmit behavior.

In Example 60, the subject matter of Example 59 includes, wherein the revising of the receive or transmit behavior comprises causing the device to remain silent during observed sensitive states.

In Example 61, the subject matter of Examples 49-60 includes, wherein the ITPkt further comprises a test pattern type that identifies the contents of the ITPat.

In Example 62, the subject matter of Example 61 includes, wherein the ITPkt further comprises a power level, a frequency or frequency band, map location, and an orientation of the antenna and radiation pattern directionality.

In Example 63, the subject matter of Examples 49-62 includes, wherein the transmitting of the attacker ITPkt is transmitted as a broadcast.

In Example 64, the subject matter of Example 63 includes, varying signal directionality while transmitting of the attacker ITPkt.

Example 65 is a computer program product comprising one or more computer readable storage media comprising computer-executable instructions operable to, when executed by processing circuitry of a device, cause the device to perform any of the methods of Examples 17-32.

Example 66 is a system comprising means to perform any of the methods of Examples 17-32.

Example 67 is a system to perform any of the operations of Examples 1-65.

Example 68 is a method to perform any of the operations of Examples 1-65.

Example 69 is at least one machine-readable medium including instructions that, when executed by processing circuitry, cause the processing circuitry to perform operations to implement of any of Examples 1-68.

Example 70 is an apparatus comprising means to implement of any of Examples 1-65.

What is claimed is:

1. An apparatus for assessing and mitigating radio frequency interference (RFI) in a network comprising a plurality of wireless devices, the apparatus comprising:
   processing circuitry; and
   memory including instructions, which when executed by the processing circuitry, cause the processing circuitry to:
     receive an attacker signal to operate as an attacker device;
     transmit, based on receiving the attacker signal, a transmitted interference test packet (ITPkt) to a wireless device of the plurality of wireless devices, wherein the transmitted ITPkt comprises ITPkt parameters comprising a time of transmission for a transmitted interference test pattern (ITPat); and
     transmit the transmitted ITPat at the time of transmission.

2. The apparatus of claim 1, wherein the processing circuitry is further to:
   receive a victim signal to operate as a victim device;
   receive an interference test packet (ITPkt) from a wireless device of the plurality of wireless devices, wherein the ITPkt comprises the ITPkt parameters;
   prepare for reception of an ITPat at the time of transmission;
   receive the ITPat at the time of transmission;
   assess a communication metric of the ITPat; and
   store the communication metric in a memory of the apparatus.

3. The apparatus of claim 2, wherein the ITPkt parameters include: a network identifier of the wireless device and a transmission globally unique identifier.

4. The apparatus of claim 2, wherein the communication metric is an error rate of the received ITPat.

5. The apparatus of claim 4, wherein the processing circuitry is further to determine the error rate by a comparison of the received ITPat with a predetermined ITPat.

6. The apparatus of claim 2, wherein the processing circuitry is further to:
   send a response containing the communication metric or a value derived therefrom to a sender of the received ITPat or a centralized data aggregator.

7. The apparatus of claim 1, wherein the processing circuitry is further to, during a mitigation phase, receive information from a centralized data aggregator (CDA).

8. The apparatus of claim 7, wherein the information from the CDA comprises a table comprising future transmission information of the apparatus in time slots, the table comprising time slot transmission information containing transmission priority information for the one or more other wireless devices.

9. The apparatus of claim 7, further comprising taking action to mitigate RFI in the network.

10. The apparatus of claim 9, wherein the action to mitigate RFI comprises causing the processing circuitry to revise a transmit, behavior.

11. The apparatus of claim 10, wherein the revision of the transmit behavior comprises causing the processing circuitry to perform at least one of lower a transmit signal intensity, adjust a transmit frequency band, adjust a transmit protocol, or adjust a transmit timing.

12. The apparatus of claim 9, wherein the action to mitigate RFI comprises causing the processing circuitry to revise receive or transmit behavior.

13. The apparatus of claim 12, wherein the revision of the receive or transmit behavior comprises causing the processing circuitry to cause the device to remain silent during observed sensitive states.

14. The apparatus of claim 1, wherein the ITPkt further comprises a test pattern type that identifies contents of the ITPat.

15. The apparatus of claim 14, wherein the ITPkt further comprises a power level, a frequency or frequency hand, map location, and an orientation of an antenna and radiation pattern directionality.

16. The apparatus of claim 1, wherein the transmission of the attacker ITPkt is transmitted as a broadcast.

17. The apparatus of claim 16, wherein the processing circuitry is further to vary signal directionality during the transmission of the attacker ITPkt.

18. A computer program product comprising ion-transitory computer readable storage media comprising computer-executable instructions operable to, when executed by processing circuitry of an apparatus for assessing and mitigating radio frequency interference (RFI) in a network, cause the apparatus to:
   receive an attacker signal to operate as an attacker device;
   transmit, based on receiving the attacker signal, an interference test packet (ITPkt) to a wireless device of a plurality of wireless devices, wherein the ITPkt comprises ITPkt parameters comprising a time of transmission for an interference test pattern (ITPat); and
   transmit the transmitted ITPat at the time of transmission.

19. The computer program product of claim 18, wherein the processing circuitry is to:
   receive a victim signal to operate as a victim device;
   receive an interference test packet (ITPkt) from a wireless device of the plurality of wireless devices, wherein the ITPkt comprises the ITPkt parameters;
   prepare for reception of an ITPat at the time of transmission;
   receive the ITPat at the time of transmission;
   assess a communication metric of the ITPat; and
   store the communication metric in a memory of the apparatus.

20. A method for assessing and mitigating radio frequency interference (RFI) in a network comprising a plurality of wireless devices, the method comprising:
   receiving an attacker signal to operate as an attacker device;
   transmitting, based on receiving the attacker signal, an interference test packet (ITPkt) to a wireless device of the plurality of wireless devices, wherein the ITPkt comprises ITPkt parameters comprising a time of transmission for an interference test, pattern (ITPat); and transmitting the transmitted ITPat at the time of transmission.

21. The method of claim 20, comprising:

receiving a victim signal to operate as a victim device;

receiving an interference test packet (ITPkt) from a wireless device of the plurality of wireless devices, wherein the ITPkt comprises the ITPkt parameters;

preparing for reception of an ITPat at the time of transmission;

receiving the ITPat at the time of transmission;

assessing a communication metric of the ITPat; and storing the communication metric in a memory of an apparatus.

* * * * *

UNITED STATES PATENT AND TRADEMARK OFFICE
CERTIFICATE OF CORRECTION

PATENT NO. : 11,160,089 B2  
APPLICATION NO. : 16/715303  
DATED : October 26, 2021  
INVENTOR(S) : Kwasnick et al.

Page 1 of 1

It is certified that error appears in the above-identified patent and that said Letters Patent is hereby corrected as shown below:

In the Claims

In Column 28, Line 8, in Claim 9, before "action", insert --an--

In Column 28, Line 11, in Claim 10, delete "transmit," and insert --transmit-- therefor In Column 28, Line 28, in Claim 15, delete "hand," and insert --band,-- therefor In Column 28, Lines 36-37, in Claim 18, delete "ion-transitory" and insert --non-transitory-- therefor In Column 29, Line 3, in Claim 20, delete "test," and insert --test-- therefor Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*